Figure 1:
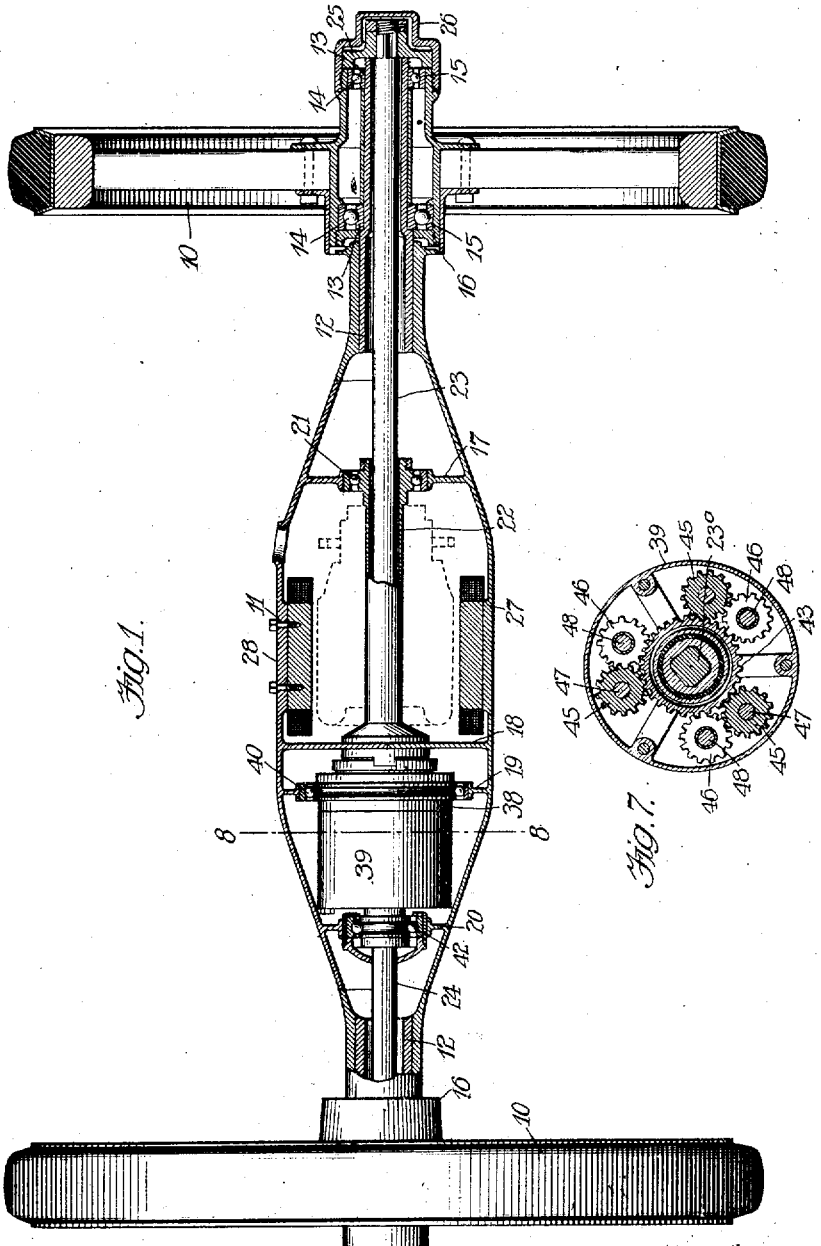

J. KROHN.

DRIVING MECHANISM FOR ELECTRICALLY PROPELLED VEHICLES.

APPLICATION FILED JAN. 21, 1914.

Reissued Dec. 29, 1914. 13,853.

4 SHEETS—SHEET 1.

Witnesses
Martin H. Olsen.
William E. Hann.

Inventor
John Krohn.
By Kuenzler & Kuenzler Attys

J. KROHN.

DRIVING MECHANISM FOR ELECTRICALLY PROPELLED VEHICLES.

APPLICATION FILED JAN. 21, 1914.

Reissued Dec. 29, 1914. 13,853.

4 SHEETS—SHEET 2.

Witnesses
Martin H. Olsen.
William E. Hann.

Inventor
John Krohn,
By Rummler & Rummler
Attys.

J. KROHN.
DRIVING MECHANISM FOR ELECTRICALLY PROPELLED VEHICLES.
APPLICATION FILED JAN. 21, 1914.
Reissued Dec. 29, 1914. 13,853.
4 SHEETS—SHEET 3.
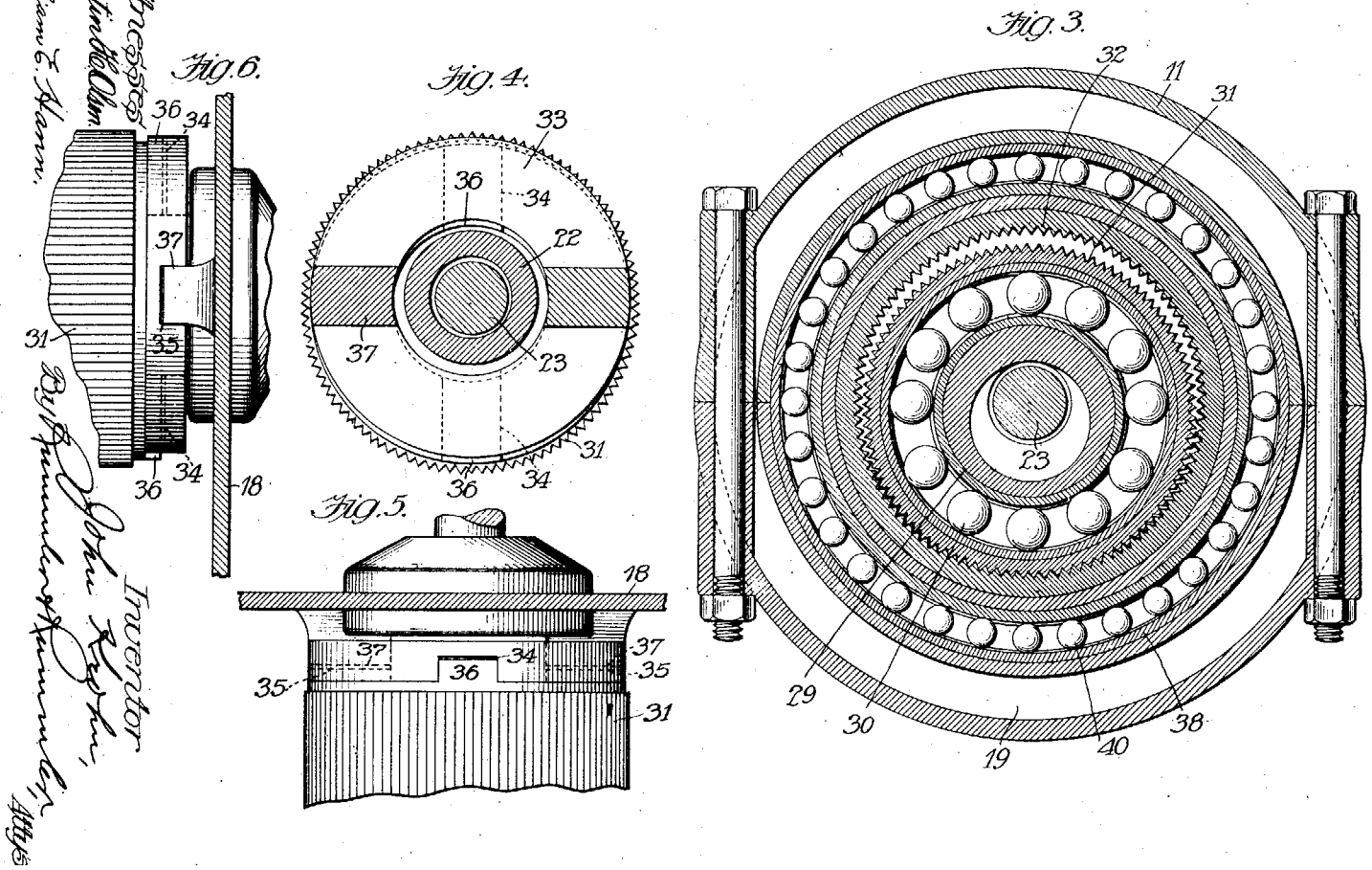
Witnesses
Martin H. Olson
William E. Hann.
Inventor
John Krohn,
By Pennie & Pennie,
Attys.

J. KROHN.
DRIVING MECHANISM FOR ELECTRICALLY PROPELLED VEHICLES
APPLICATION FILED JAN. 21, 1914.
Reissued Dec. 29, 1914. 13,853.
4 SHEETS—SHEET 4.
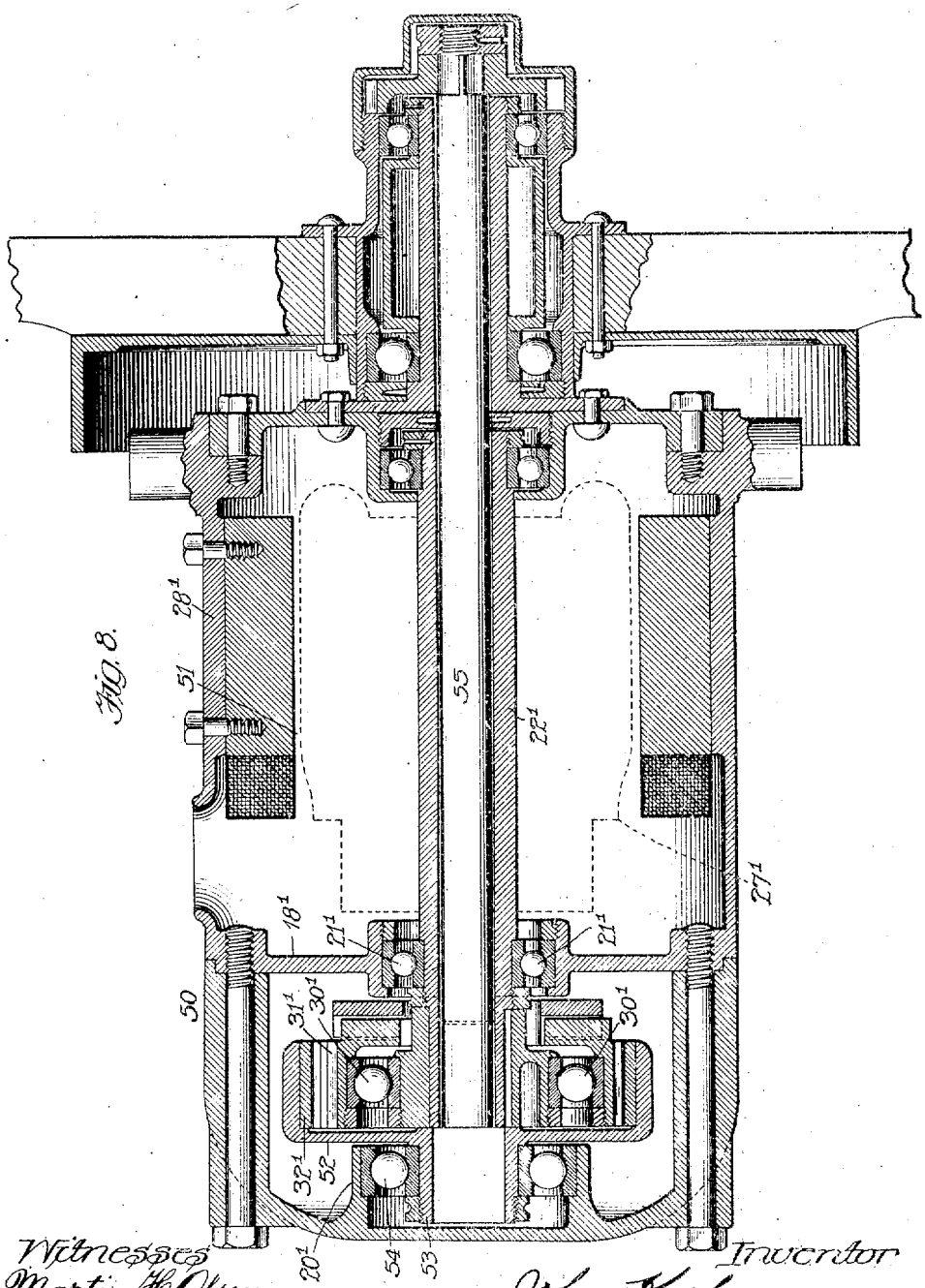
Witnesses
Martin H. Olsen.
William E. Hann.
Inventor
John Krohn,
By Rummler & Rummler
Att'ys.

UNITED STATES PATENT OFFICE.

JOHN KROHN, OF CHICAGO, ILLINOIS.

DRIVING MECHANISM FOR ELECTRICALLY-PROPELLED VEHICLES.

13,853. Specification of Reissued Letters Patent. Reissued Dec. 29, 1914.

Original No. 1,032,068, dated July 9, 1912, Serial No. 578,798. Application for reissue filed January 21, 1914. Serial No. 813,596.

*To all whom it may concern:*

Be it known that I, JOHN KROHN, a citizen of the United States, residing in Chicago, county of Cook, and State of Illinois, have invented certain new and useful Improvements in Driving Mechanism for Electrically-Propelled Vehicles, of which the following is a specification.

My invention is applicable to electric vehicles of all kinds, such as pleasure, commercial, and railway cars, and will differ only in relative dimensions for the various applications.

Among the salient objects of the invention are to provide a driving mechanism containing the fewest possible parts necessary to effect a reduction of the high speed of the electric motor to the relatively low rotative speed of the wheels; to embody this mechanism in such small dimensions of parts and compact form as to enable the same to be inclosed within motor housing or casing without materially increasing the dimensions of the same; to inclose all the working parts in a dust and dirt-proof compartment in which the gears can run in an oil bath so as to reduce wear and tear to a minimum and eliminate the noise due to the outside chains and gears, as in other constructions; to provide a mechanism in which the gear ratio can be altered according to requirements without materially altering the dimensions of the gearing; to provide a mechanism having the form and character of a complete unit which can be handled as such, and which can completely replace other and more complicated mechanisms in existing constructions; to provide a mechanism which permits of the car being washed without danger of flooding the driving mechanism with water; to provide a driving mechanism which can be manufactured economically, which will retain the original alinement of the parts to one another indefinitely, and which cannot be distorted in service by an uneven road surface; and to provide a mechanism permitting the use either of a single motor to drive both hind wheels, or individual motors to drive two or all of the wheels of a vehicle separately.

With these and other minor objects in view the invention consists in the novel construction and arrangement of parts hereinafter described and more particularly pointed out in the claims.

Practical forms in which my invention may be embodied are shown in the accompanying drawings, in which—

Figure 2:
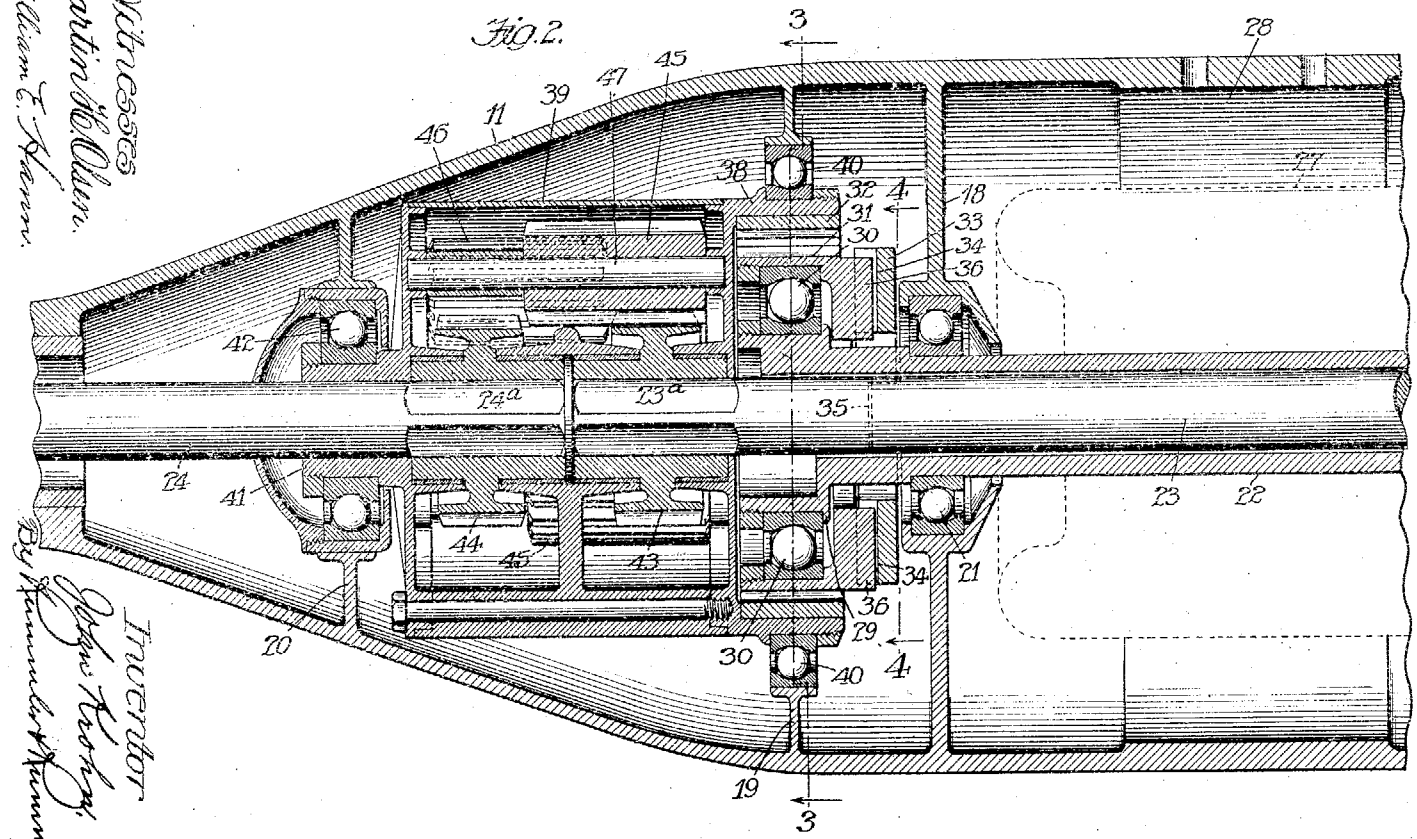

Figure 1 is an elevational view, partly in section, of a rear axle structure and wheels, showing my invention as embodied in a construction employing a divided floating axle and a single motor driving both wheels. Fig. 2 is an enlarged axial section through that portion of the rear axle structure carrying the motor, driving gear, and differential or balance gear. Fig. 3 is a vertical transverse section on the line 3—3 of Fig. 2. Fig. 4 is a similar cross section on the line 4—4 of Fig. 2. Figs. 5 and 6 are fragmentary plan and elevational views, respectively, in cross section through one of the transverse supporting webs of the casing showing the mechanism for confining the driving member of the speed reducing gear against rotation while permitting gyratory motion thereof. Fig. 7 is a cross sectional view through the spur differential or compensating gear; and Fig. 8 shows a modification wherein an independent motor is applied to each wheel.

Referring to the drawings, 10 designates the two rear wheels of an electrically propelled vehicle, and 11 the hollow bridge or gear and axle casing which, in this instance, is made sufficiently large to accommodate not only the differential or balance gear but also the motor and the driving connections between the armature shaft of the motor and the differential gear. Rigidly secured to and within the ends of the casing 11 are the end axle casings or tubes 12 supporting the inner stationary bearing rings 13 of the usual ball-bearings 14, the outer bearing rings 15 being fast with and carried by the hubs 16 of the wheels.

The hollow casing 11 is provided with a plurality of rigid transverse webs 17, 18, 19, and 20 (Fig. 1). In and between the webs 17 and 18 is rotatably mounted by ball-bearings 21 a hollow driving shaft 22, which loosely surrounds one section 23 of the divided, floating axle, the other section of said axle being shown at 24; the inner meeting ends of said axle sections are squared as shown at 23ª and 24ª, respectively, (Fig. 2) and have mounted thereon the two main spur wheels of the differential gear, as more fully hereinafter described; said axles at their outer ends extending through the stationary end axle casings 12 and being drivingly connected through spiders 25 to the hubs of the wheels, said spiders and the bearings being protected by dust-caps 26 screwed on to the outer ends of the hubs.

Fast on the hollow driving shaft 22 is the armature 27 of an electric motor, the field whereof is indicated at 28. The shaft 22 is provided at one end with an integral eccentric head 29, preferably made hollow for the sake of lightness; and on this eccentric head is mounted, through the agency of an ordinary anti-friction or ball-bearing 30, the driving member 31 of the speed reducing driving gear. This latter comprises the internal member 31 formed on its periphery with V-shaped teeth and the outer driven member 32 which has on its inner periphery similar V-shaped teeth, but differing in number from the teeth on the member 31, the inner member having, say sixty teeth; and the outer member say sixty-four teeth; although the ratio of the teeth may be changed with a corresponding change in the speed imparted, the speed increasing with an increase in the difference in the number of teeth carried by the respective gear members. The internal diameter of the outer member 32 is somewhat greater than the external diameter of the inner member 31, and the two are at all times in slightly eccentric relation to each other. The inner gear member 31 is confined against rotation but permitted a gyratory or circular sweeping movement within the outer gear member by means of a connection to the web 18 of such a character that it may have a bodily radial movement in any direction; the connection herein shown comprising a disk 33 that is provided on one side with a pair of diametrically opposite radial grooves 34 and on its opposite side with a similar pair of diametrically opposite radial grooves 35 located 90 degrees from the grooves 34; and keys 36 and 37 carried by the gear member 31 and the stationary web 18, respectively, slidably engaging said grooves.

The outer gear member 32 is rigidly secured within and carried by an annular flange 38 formed on one end of the differential box or casing 39, said flange being mounted for rotary movement through an anti-friction bearing 40 in the transverse web 19 of the axle bridge. The outer end of the differential gear box or casing 39 is formed with a hub 41 which is rotatably mounted through an anti-friction bearing 42 in the transverse web 20. The differential or compensating gear herein shown is the ordinary type of spur gear differential, comprising essentially the main gears 43 and 44 fast on the squared ends of the axle sections, and a plurality of pairs of spur pinions 45 and 46 rotatably mounted on shafts 47 and 48 journaled in the end walls of the differential casing, the pinions 45 meshing with the gears 43, pinions 46 meshing with the gears 44, and the two pinions being made of such length as to overlap and mesh with each other between the main gears 43 and 44.

The operation will be apparent from the foregoing description of the structure of the mechanism, but may be briefly described as follows: The current being supplied to the motor, the rotation of the armature at a rapid speed imparts a similar rotation to the hollow driving shaft 22 secured thereto and to the eccentric 29. The eccentric imparts a rapid gyratory or sweeping movement to the inner gear member 31, which latter, by reason of having a less number of teeth than the outer gear member 32, imparts a rotation, at a greatly reduced speed, to the latter, said outer gear 32, through the differential gear, transmitting this reduced speed to the axle sections, which latter transmit the rotary movement to the wheels. The type of combined driving and speed reducing gear herein shown has a number of advantages. In the first place the entire reduction of speed is effected through the use of but two gears. The gearing is economical of power, since friction between the gear teeth is practically eliminated. The V-shaped gear teeth are of simple form and easily and economically manufactured. The speed ratio, which is approximately 1 to 16 in the structure as herein shown, can easily be changed by substituting either an inner or outer gear member having a different number of teeth and without requiring any change in diameter of either.

In Fig. 8 I have shown an application of the invention wherein the wheels are driven each by an independent motor, which arrangement, of course, dispenses with the necessity of a differential gear. In this construction the stationary axle bridge 50 is formed with a compartment 51 at each end adjacent to the wheel hub, within which is housed the field 28′ and armature 27′ of the motor, the latter being fast on the hollow driving shaft 22′. Said driving shaft is rotatably supported in an anti-friction bearing 21′ carried by the transverse web 18′ of the casing, and has integral with or keyed to one end an eccentric 29′ supporting, through anti-friction bearings 30′, the inner gear member 31′ of the driving and speed reducing gear. The coöperating outer gear member 32′ is rigid with and carried by a flanged disk 52, the hub 53 of which latter is journaled by anti-friction bearings 54 in a transverse web 20′ of the casing, said hub being keyed on the inner end of the floating shaft 55, this latter being drivingly connected at its outer end to the hub of the wheel in the manner and by the means already described in connection with the form of the invention shown in Figs. 1 to 7 inclusive.

From the foregoing it will be seen that the several objects of the invention specified are attained in the mechanism described. Power is applied more directly to the axles than has heretofore been accomplished in mechanisms of this character; the necessary reduction of speed is effected through a transmission gear of extreme simplicity and of a practically frictionless character; the usual rear axle bridge, by a slight enlargement, is made to serve as a casing and protection not only for the differential gear (when employed) but for the motor and transmission and speed reducing gear as well; and the construction is capable of being manufactured economically, pitch ratio may be varied as desired by the simple substitution of an inner or outer gear member having a different number of teeth. It will be apparent to those skilled in the art that the details of the structure, as shown and described, may be considerably varied, without involving any essential change in the character of the mechanism and the results secured thereby, and hence I do not limit the invention to the particular embodiment thereof disclosed, except to the extent clearly indicated in specific claims.

I claim:

1. In a power driven vehicle, the combination of driving axle sections each connecting at its outer end with the vehicle drive wheel, a housing concentrically disposed about said axle sections and supported from said drive wheels, a differential transmission train within said housing surrounding the inner ends of said axle sections and connected therewith at one end, a rim at the other end of said transmission train concentric with said axle sections and having internal transmission teeth, a sleeve concentric with said axle sections and having a bearing head eccentric with said axle sections and disposed within said rim, a second rim concentrically journaled on said eccentric head and having external teeth of a different number than that of the teeth on the first mentioned rim, means for preventing axial rotation of said second rim about said head, and an electric motor having its parts mounted concentrically within said housing about said sleeve and having its rotating element connected in driving relation with said sleeve, rotation of said sleeve and eccentric head causing radial displacement of said second rim and radial engagement of the teeth thereof with the internal teeth of the first mentioned rim whereby the axle sections are driven at a speed different from that of the sleeve axle.

2. In a power driven vehicle, the combination of driving axle sections each connecting at its outer end with a vehicle drive wheel, a housing concentrically disposed about said axle sections and supported from said drive wheels, a differential transmission train within said housing surrounding the inner ends of said axle sections and connected therewith at one end, a rim at the other end of said transmission train concentric with said axle sections and having internal transmission teeth, a sleeve concentric with said axle sections and having a bearing head eccentric with said axle sections and disposed within said rim, a ball bearing mounted on said eccentric bearing head, a second rim encircling said ball bearing and having external teeth of a different number than that of the teeth on the first mentioned rim, means for preventing axial rotation of said second rim about said head, and an electric motor having its parts mounted concentrically within said housing about said sleeve and having its rotating element connected in driving relation with said sleeve, rotation of said sleeve and eccentric head causing radial displacement of said second rim and radial engagement of the teeth thereof with the internal teeth of the first mentioned rim whereby the axle sections are driven at a speed different from that of the sleeve axle.

3. A driving unit for electric vehicles, comprising a vehicle supporting wheel, an internal and an external gear intermeshing, one of said gears being connected to drive said wheel, means for restraining the axial rotation of the remaining gear, means for giving said remaining gear an eccentric movement around the axis of the driving gear, and an electric motor having its rotating element connected to operate said last named means.

4. In a power driven vehicle, the combination of a vehicle supporting wheel, a pair of intermeshing internal and external gears one of said gears being connected to drive said wheel, means for giving the other gear an eccentric movement around the axis of the driven gear, and an electric motor having its rotating element connected to operate said means.

5. In a power driven vehicle, the combination of a vehicle supporting wheel, a pair of intermeshing internal and external gears, one of said gears having connections to drive said wheel, means for giving one of said gears an eccentric movement with respect to the other gear, and an electric motor having its rotating element connected to operate said means.

Signed at Chicago this 26th day of December, 1913.

JOHN KROHN.

Witnesses:
RUDOW RUMMLER,
M. IRENE HUTCHINGS.